(12) United States Patent
Scalici

(10) Patent No.: US 11,933,392 B2
(45) Date of Patent: Mar. 19, 2024

(54) HYBRID DRIVE UNIT

(71) Applicant: DANA GRAZIANO S.R.L., Rivoli (IT)

(72) Inventor: Giorgio Scalici, Rivoli (IT)

(73) Assignee: DANA GRAZIANO S.R.L., Rivoli (IT)

( * ) Notice: Subject to any disclaimer, the term of this patent is extended or adjusted under 35 U.S.C. 154(b) by 6 days.

(21) Appl. No.: 17/661,020

(22) Filed: Apr. 27, 2022

(65) Prior Publication Data

US 2022/0349459 A1 Nov. 3, 2022

(30) Foreign Application Priority Data

Apr. 28, 2021 (DE) ..................... 10 2021 204 245.7

(51) Int. Cl.
| | |
|---|---|
| *B60K 17/16* | (2006.01) |
| *B60K 17/02* | (2006.01) |
| *B60K 23/04* | (2006.01) |
| *F16H 48/22* | (2006.01) |
| *F16H 48/36* | (2012.01) |
| *B60K 6/365* | (2007.10) |

(52) U.S. Cl.
CPC ............. *F16H 48/22* (2013.01); *B60K 17/02* (2013.01); *B60K 17/165* (2013.01); *B60K 23/04* (2013.01); *F16H 48/36* (2013.01); *B60K 6/365* (2013.01); *B60K 2023/043* (2013.01); *B60Y 2200/92* (2013.01); *B60Y 2400/804* (2013.01)

(58) Field of Classification Search
CPC .......... F16H 48/22; F16H 48/36; F16H 48/08; B60K 17/02; B60K 17/165; B60K 23/04; B60K 6/365; B60K 2023/043; B60K 6/26; B60K 6/387; B60K 6/48; B60K 2006/4808; B60K 2006/4833; B60K 17/16; B60K 6/38; B60K 1/02; B60K 6/40; B60K 2006/381; B60K 2023/005–0891; B60Y 2200/92; B60Y 2400/804; B60W 10/02; B60W 10/08; B60W 10/184; B60W 2520/28; B60W 2720/406; Y02T 10/62

See application file for complete search history.

(56) References Cited

U.S. PATENT DOCUMENTS

| | | | | |
|---|---|---|---|---|
| 8,641,571 B2* | 2/2014 | Ichikawa | ............... | B60K 6/387 477/6 |
| 8,684,885 B2* | 4/2014 | Ichikawa | ................. | B60K 6/44 477/6 |
| 9,221,334 B2* | 12/2015 | Knoblauch | .............. | B60K 1/02 |
| 10,927,934 B2* | 2/2021 | Zheng | .................... | B60K 17/16 |

(Continued)

FOREIGN PATENT DOCUMENTS

| | | | |
|---|---|---|---|
| CN | 217415461 U | * | 9/2022 |
| DE | 102007034561 A1 | | 2/2009 |

(Continued)

*Primary Examiner* — Tinh Dang
(74) *Attorney, Agent, or Firm* — McCoy Russell LLP

(57) ABSTRACT

In one example, a hybrid drive unit comprises an electric motor, an axle differential for connection with a further motor, a first axle half shaft and a second axle half shaft connected to the axle differential, a first clutching device and a second clutching device. The electric motor is selectively drivingly engagable with the first axle half shaft via the first clutching device and with the second axle half shaft via the second clutching device.

16 Claims, 7 Drawing Sheets

(56) References Cited

U.S. PATENT DOCUMENTS

| | | | |
|---|---|---|---|
| 11,285,933 B2* | 3/2022 | Yamamoto | B60W 10/08 |
| 2003/0177860 A1* | 9/2003 | Peura | B60K 23/0808 |
| | | | 74/650 |
| 2006/0260897 A1* | 11/2006 | Baasch | F16D 28/00 |
| | | | 192/48.2 |
| 2008/0087485 A1 | 4/2008 | Andersson et al. | |
| 2012/0325048 A1* | 12/2012 | Raisch | B60W 10/08 |
| | | | 903/902 |
| 2013/0252774 A1* | 9/2013 | Suntharalingam | B60K 6/387 |
| | | | 475/5 |
| 2015/0337937 A1 | 11/2015 | Rodriguez | |
| 2017/0059023 A1 | 3/2017 | Severinsson et al. | |
| 2019/0389305 A1* | 12/2019 | Shimizu | B60T 8/32 |
| 2020/0108716 A1* | 4/2020 | Iwazaki | F16H 48/05 |
| 2020/0156623 A1* | 5/2020 | Takaue | B60K 23/04 |
| 2020/0331526 A1* | 10/2020 | Flaxman | B60K 6/485 |
| 2021/0107443 A1* | 4/2021 | Yamamoto | B60K 1/00 |
| 2021/0347257 A1* | 11/2021 | Zalewski | B60K 17/356 |

FOREIGN PATENT DOCUMENTS

| | | | | |
|---|---|---|---|---|
| DE | 102019115918 A1 * | 12/2020 | | |
| EP | 3351414 A2 * | 7/2018 | | B60K 17/02 |
| GB | 2466967 A | 7/2010 | | |
| GB | 2466968 A | 7/2010 | | |
| GB | 2466975 A | 7/2010 | | |
| JP | 2019206204 A | 12/2019 | | |
| KR | 101399263 B1 | 5/2014 | | |

* cited by examiner

HYBRID DRIVE UNIT

CROSS REFERENCE TO RELATED APPLICATION

The present application claims priority to German Patent Application No. 10 2021 204 245.7, entitled "HYBRID DRIVE UNIT", and filed Apr. 28, 2021. The entire contents of the above-listed application is hereby incorporated by reference for all purposes.

TECHNICAL FIELD

The present disclosure relates to a hybrid drive unit, such as for a vehicle.

BACKGROUND AND SUMMARY

In the field of automotive transmissions various devices and mechanisms are known that allow the controlled transmission of torque from a power source such as a combustion engine or an electric motor to two or more wheels or axle half shafts.

For example, US 2017/059023 A1 relates to a torque vectoring device for a vehicle comprising an electrical motor connected to a differential mechanism via a transmission, and further comprising at least one control means for changing the torque path of the transmission between a first mode, in which the transmission connects the electrical motor to the input shaft of the differential mechanism for hybrid drive mode, and a second mode, in which the transmission connects the electrical motor to the output shaft of the differential mechanism for torque vectoring mode.

The present disclosure addresses the problem of designing a hybrid drive unit for a vehicle which provides a torque vectoring functionality in a simple and efficient manner.

A hybrid drive unit that provides such a functionality is described herein. Special embodiments are described in the dependent claims.

Specifically, the presently proposed hybrid drive unit comprises an electric motor, an axle differential for connection with a further motor, a first and a second axle half shaft connected to the axle differential, a first clutching device and a second clutching device, wherein the electric motor is selectively drivingly engageable with the first axle half shaft via the first clutching device, and with the second axle half shaft via the second clutching device.

As the electric motor is selectively drivingly engagable with the first axle half shaft via the first clutching device, and with the second axle half shaft via the second clutching device, torque transmission from the electric motor to the first axle half shaft and to the second axle half shaft is controllable by controlling the first clutching device and the second clutching device.

For example, the first and the second clutching device may each have an open state, a closed state and a slip state. The first/second clutching device may be configured such that when the first/second clutching device is in the open state, torque transmission from the electric motor to the first/second axle half shaft through the first/second clutching device is interrupted, respectively. The first/second clutching device may configured such that when the first/second clutching device is in the closed state, there is no slip between an input of the first/second clutching device and an output of the first/second clutching device and a non-zero torque may be transmitted from the electric motor to the first/second axle half shaft through the first/second clutching device, respectively. And the first/second clutching device may configured such that when the first/second clutching device is in the slip state, there is a slip between an input of the first/second clutching device and an output of the first/second clutching device so that a non-zero torque may be transmitted from the electric motor to the first/second axle half shaft through the first/second clutching device, respectively. For example, the first/second clutching device may be configured such that when the first/second clutching device is in the slip state, a slip between an input of the first/second clutching device and an output of the first/second clutching device is variable or continuously variable so that a torque transmitted from the electric motor to the first/second axle half shaft through the first/second clutching device is variable or continuously variable by varying the slip between the input of the first/second clutching device and the output of the first/second clutching device, respectively.

For example, the first/second clutching device may include a wet clutch comprising a plurality of input friction plates connected to an input of the first/second clutching device and a plurality of output friction plates connected to an output of the first/second clutching device, wherein the input friction plates and the output friction plates are alternately disposed and a degree of frictional engagement between the input friction plates and the output friction plates is controllable by controlling a hydrostatic pressure in a clutch chamber of the first/second clutching device, respectively. However, it is understood that the first/second clutching device may include any other type of clutching device known in the art of automotive transmissions.

The hybrid drive unit may further comprise a transmission shaft arranged in parallel to the first axle half shaft and the second axle half shaft. The electric motor may then be selectively drivingly engageable with the first axle half shaft via the transmission shaft and the first clutching device, and with the second axle half shaft via the transmission shaft and the second clutching device. Such an arrangement may allow a compact design.

In this case, the electric motor may be selectively drivingly engageable with the first axle half shaft via a first transmission gear disposed on the transmission shaft and a first axle gear disposed on the first axle half shaft. For instance, the first transmission gear may be in mesh with the first axle gear. The first clutching device may be configured to selectively drivingly engage the first transmission gear with the transmission shaft or to selectively drivingly engage the first axle gear with the first axle half shaft. Additionally or alternatively, the electric motor may be selectively drivingly engageable with the second axle half shaft via a second transmission gear disposed on the transmission shaft and a second axle gear disposed on the second axle half shaft. For instance, the second transmission gear may be in mesh with the second axle gear. The second clutching device may be configured to selectively drivingly engage the second transmission gear with the transmission shaft or to selectively drivingly engage the second axle gear with the second axle half shaft.

The hybrid drive unit may further comprise a controller configured to control the first clutching device and the second clutching device independently of one another. Usually, the controller comprises electronic circuitry including a programmable processing unit such as a microprocessor, a Field Programmable Gate Array (FPGA), or the like. For example, the controller may be configured to control the first clutching device and the second clutching device in such a way that at a given instant a level of engagement between an input and an output of the first clutching device is different from a level of engagement between an input and an output of the second clutching device. In this way, the controller may be configured to control the clutching devices to act as an active differential and/or as an active torque vectoring device.

The hybrid drive unit may further comprise a first speed sensor for measuring a rotational speed of the first axle half shaft or of a first vehicle wheel drivingly connected or drivingly connectable with the first axle half shaft, and a second speed sensor for measuring a rotational speed of the second axle half shaft or of a second vehicle wheel drivingly connected or drivingly connectable with the second axle half shaft. The controller may then be configured to control the first clutching device and the second clutching device based on at least one of or all of: a first speed sensor signal or first speed sensor data received from the first speed sensor, and a second speed sensor signal or second speed sensor data received from the second speed sensor. For example, the controller may be configured such that when the first/second speed sensor detects that the first/second axle half shaft is overspeeding, such as when a first/second vehicle wheel mounted on the first/second axle half shaft loses traction, the controller commands the first/second clutching device to disengage or to at least partially disengage in order to reduce torque transmission from the electric motor to the first/second axle half shaft through the first/second clutching device, respectively.

The hybrid drive unit may further comprise a first brake for braking the first axle half shaft or for braking a first vehicle wheel mounted on the first axle half shaft, and a second brake for braking the second axle half shaft or for braking a second vehicle wheel mounted on the second axle half shaft. The controller may then be configured to control the first brake and the second brake based on at least one of or all of: the first speed sensor signal or the first speed sensor data, and the second speed sensor signal or the second speed sensor data. For example, the controller may be configured such that when the first/second speed sensor detects that the first/second axle half shaft is overspeeding, such as when the first/second wheel mounted on the first/second axle half shaft loses traction, the controller commands the first/second brake to brake or slow down the first/second axle half shaft, respectively.

Additionally or alternatively, the controller may be configured to control the first clutching device and the second clutching device based on at least one of or all of: a vehicle torque request, a vehicle speed request, and a steering angle. For example, the controller may be configured such that when it receives a request for an increase in torque and/or speed, the controller commands the first clutching device and/or the second clutching device to engage or to at least partially engage or to increase engagement in order to increase torque transmission from the electric motor to the first axle half shaft and/or to the second axle half shaft through the first/second clutching device, respectively.

The first axle half shaft and the second axle half shaft may be coaxially aligned. The hybrid drive unit may further comprise a first vehicle wheel mounted on and coaxially aligned with the first axle half shaft, and a second vehicle wheel mounted on and coaxially aligned with the second axle half shaft.

The electric motor may comprise a rotor which is coaxially aligned with or arranged in parallel to the first axle half shaft. For example, in a compact arrangement one of the first axle half shaft and the second axle half shaft may reach through the rotor of the electric motor.

The hybrid drive unit may additionally comprise a further motor such as a combustion engine, wherein the further motor is configured to drive the first axle half shaft and the second axle half shaft via the axle differential.

An embodiment of the presently proposed electric drive unit is depicted in the figures and described in the following detailed description.

DETAILED DESCRIPTION

Figure 1:
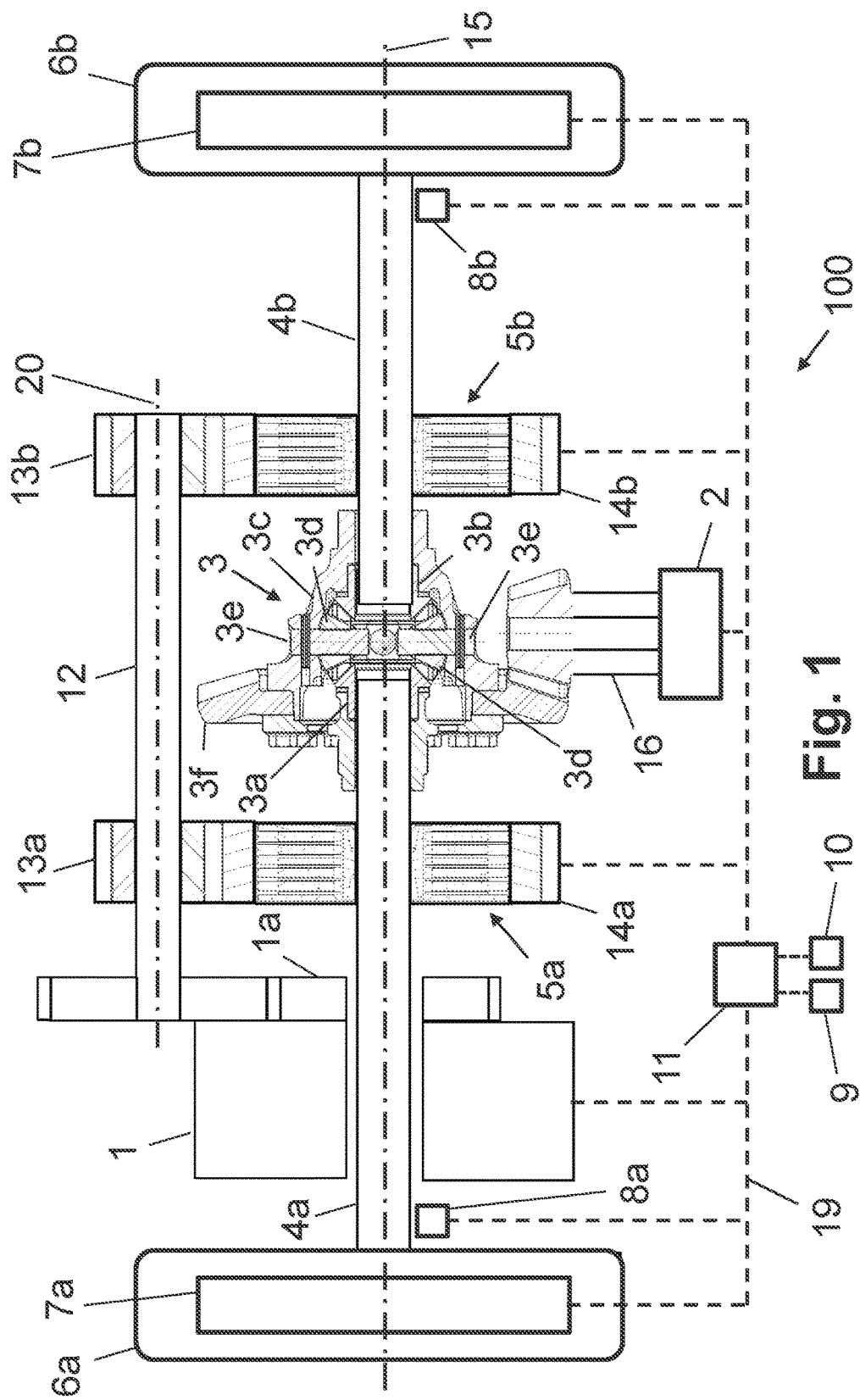
FIG. 1 schematically shows a hybrid drive unit of the presently proposed type according to a first embodiment wherein a rotor of an electric motor is coaxially aligned with two axle half shafts.

FIG. 1 shows a schematic of a hybrid drive unit 100 of the presently proposed type according to a first embodiment. The hybrid drive unit 100 includes an electric motor 1, a further motor 2, a differential 3, a first axle half shaft 4a, a second axle half shaft 4b, a first clutching device 5a, and a second clutching device 5b. The electric motor 1 may include any type of synchronous or asynchronous electric machine, for example. The further motor 2 may include a combustion engine, another electric motor, a hydraulic motor, or the like. As shown in the figure, the axle half shafts 4a, 4b may be coaxially aligned with respect to a common rotation axis 15. However, it is likewise conceivable that the axle half shafts 4a, 4b may be slightly tilted with respect to each other. In the embodiment depicted in FIG. 1, a rotor 1a of the electric motor 1 is coaxially aligned with the first axle half shaft 4a. Specifically, the electric motor 1 is arranged around the first axle half shaft 4a. The first axle half shaft 4a reaches through the electric motor 1 or through the rotor 1a of the electric motor 1, thereby providing a compact arrangement.

The differential 3 may be an open differential, for example. Specifically, the differential 3 comprises a first side gear 3a connected to the first axle half shaft 4a, a second side gear 3b connected to the second axle half shaft 4b, a differential housing 3c, and spider gears 3d rotatably mounted on differential pins 3e connected to the differential housing 3c. The differential 3 allows the axle half shafts 4a, 4b connected to the differential 3 to rotate at different speeds. However, in some embodiments the differential 3 may possibly include an additional locking mechanism for selectively rotatably locking the side gears 3a, 3b to the differential housing 3c. The further motor 2 is configured to drive the axle half shafts 4a, 4b via the differential 3. Specifically, the further motor 2 is drivingly engaged with the differential 3 through a bevel pinion 16 and a ring gear 3f of the differential 3. The ring gear 3f is rigidly connected to the differential housing 3c. In the example, components of the differential 3 are drawn to scale.

The electric motor 1 is selectively drivingly connected to the first axle half shaft 4a via a transmission shaft 12, a first transmission gear 13a disposed on the transmission shaft 12, a first axle gear 14a disposed on the first axle half shaft 4a, and via the first clutching device 5a. Here, the first transmission gear 13a meshes with the first axle gear 14a. However, it is understood that in alternative embodiments the first transmission gear 13a and the first axle gear 14a may be drivingly engaged with one another via one or more further transmission components, for example via one or more further gears and/or via one or more further shafts. And the electric motor 1 is selectively drivingly connected to the second axle half shaft 4b via the transmission shaft 12, a second transmission gear 13b disposed on the transmission shaft 12, a second axle gear 14b disposed on the second axle half shaft 4b, and via the second clutching device 5b. Here, the second transmission gear 13b meshes with the second axle gear 14b. However, it is understood that in alternative embodiments the second transmission gear 13b and the second axle gear 14a may be drivingly engaged with one another via one or more further transmission components, for example via one or more further gears or via one or more further shafts.

The transmission shaft 12 is disposed such that a rotation axis 20 of the transmission shaft 12 is arranged in parallel to and at a distance from the axle half shafts 4a, 4b or the rotation axis 15 defined by the axle half shafts 4a, 4b. In the embodiment depicted in FIG. 1, the first clutching device 5a is disposed around the first axle half shaft 4a and selectively drivingly engages the first axle gear 14a with the first axle half shaft 4a. The first transmission gear 13a is rigidly connected to the transmission shaft 12. Similarly, the second clutching device 5b is disposed around the second axle half shaft 4b and selectively drivingly engages the second axle gear 14b with the second axle half shaft 4b. The second transmission gear 13b is rigidly connected to the transmission shaft 12. It is understood that in alternative embodiments not explicitly depicted here one or both of the clutching devices 5a, 5b could instead be disposed around the transmission shaft 12 and configured to selectively drivingly engage one or both of the first transmission gear 13a and the second transmission gear 13b with the transmission shaft 12, respectively. In that case, one or both of the axle gears 14a, 14b may be rigidly connected to one or both of the axle half shafts 4a, 4b, respectively.

The clutching devices 5a, 5b are typically configured to provide variable or continuously variable frictional engagement between an input and an output of the clutching devices 5a, 5b, respectively. Specifically, in the embodiment depicted in FIG. 1 the first clutching device 5a is configured to provide variable or continuously variable frictional engagement between the first axle gear 14a and the first axle half shaft 4a. The second clutching device 5b is configured to provide variable frictional engagement between the second axle gear 14b and the second axle half shaft 4b. For example, the clutching devices 5a, 5b may each include a wet clutch wherein a plurality of input friction plates connected to an input of the clutching device may be selectively frictionally engaged with a plurality of output friction plates connected to an output of the clutching device by varying a hydrostatic pressure in a clutch chamber, for example by means of opening or closing a control valve and/or by varying a pressure provided by a pressure source such as a pump or a hydraulic cylinder. However, it is understood that the clutching devices 5a, 5b may include other types of clutches or clutching devices known in the art of automotive transmissions, such as but not limited to a dry clutch, a cone clutch, or the like.

The hybrid drive unit 100 further includes a first vehicle wheel 6a drivingly connected or drivingly connectable to the first axle half shaft 4a, a first brake 7a for braking the first axle half shaft 4a and/or for braking the first vehicle wheel 6a, and a first speed sensor 8a for measuring a rotational speed of the first axle half shaft 4a and/or of the first vehicle wheel 6a. And the hybrid drive unit 100 includes a second vehicle wheel 6b drivingly connected or drivingly connectable to the second axle half shaft 4b, a second brake 7b for braking the second axle half shaft 4b and/or for braking the second vehicle wheel 6b, and a second speed sensor 8b for measuring a rotational speed of the second axle half shaft 4b and/or of the second vehicle wheel 6b. The hybrid drive unit 100 further includes a torque request receiving device 9 such as but not limited to a throttle pedal, a joystick, or the like. And the hybrid drive unit 100 includes a steering angle sensor 10.

The hybrid drive unit 100 also comprises a controller 11. The controller 11 typically comprises electronic circuitry including a programmable processing unit such as but not limited to a microprocessor, an FPGA, or the like. The controller 11 may include a single device or a plurality of separate devices. The controller 11 is configured to receive one or more input signals including one or more of a torque request from the torque request receiving device 9, a steering angle or steering request from the steering angle sensor 10, and speed signals or speed data from the speed sensors 8a, 8b and indicative of a rotational speed of the axle half shafts 4a, 4b and/or of the vehicle wheels 6a, 6b, respectively. Based on one or more or all of these input signals, the controller 11 is configured to control one or more or all of the electric motor 1, for example a torque and/or speed provided by the electric motor 1, the further motor 2, for example a torque and/or speed provided by the further motor 2, the brakes 7a, 7b, and the clutching devices 5a, 5b, for example a degree of engagement between an input and an output of the clutching devices 5a, 5b, respectively. For example, the controller 11 is configured to control the clutching devices 5a, 5b independently of one another. More specifically, the controller 11 is configured to control the degree of engagement between an input and an output of the first clutching device 5a independently of a degree of engagement between an input and an output of the second clutching device 5b. In the figures, communications lines between the controller 11 and the motors 1, 2, the clutching devices 5a, 5b, the brakes 7a, 7b, the sensors 8a, 8b, the torque request receiving device 9, and steering angle sensor 10 are represented by dashed lines 19. The dashed lines 19 may include wired or wireless connections.

FIG. 2-5 show different non-limiting examples of modes of operation of the hybrid drive unit 100 of FIG. 1. Here and in all of the following, features recurring in different figures are designated with the same reference signs.

Figure 2:
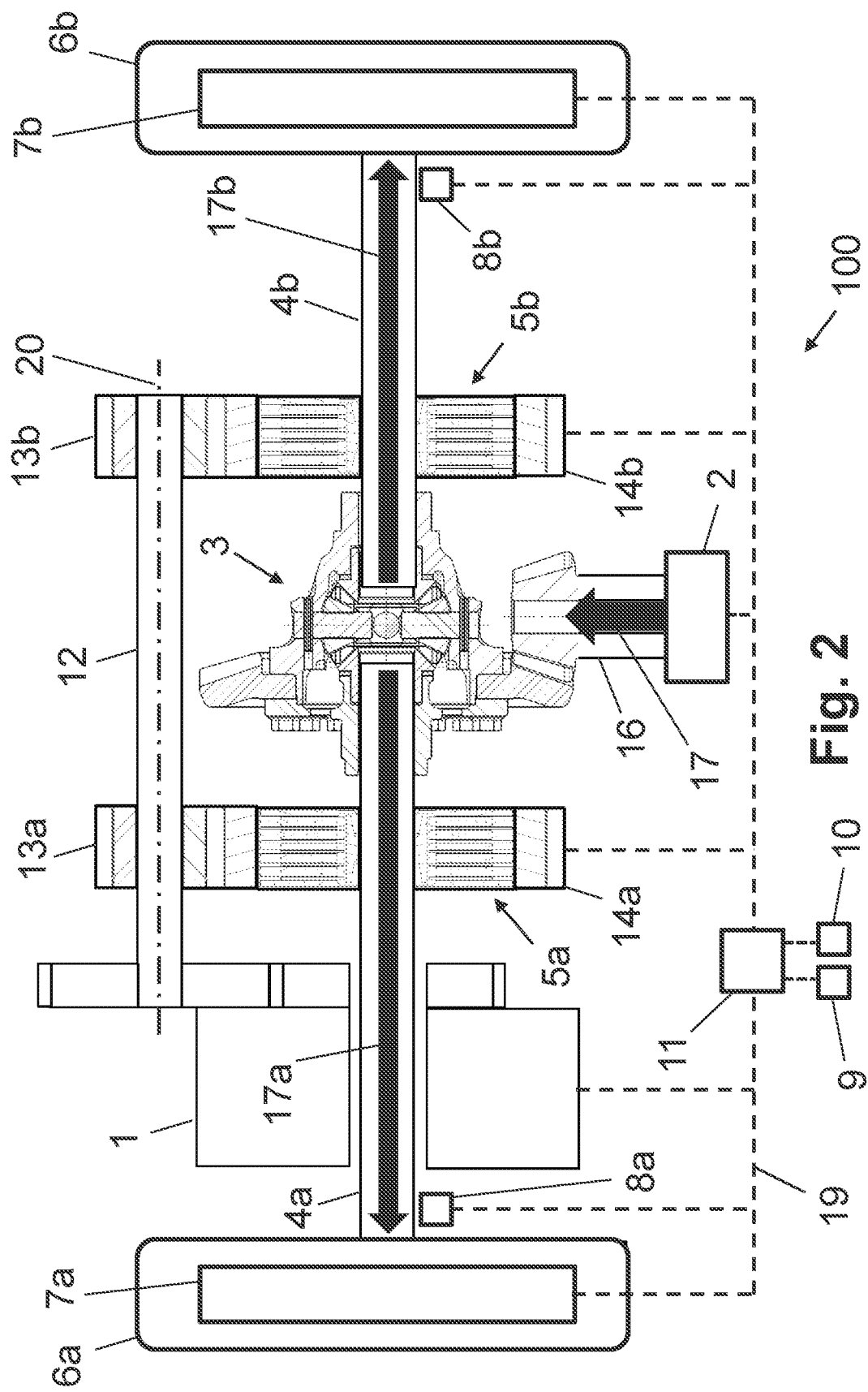
FIG. 2 schematically shows the hybrid drive unit of FIG. 1, with arrows indicating a torque flow between a combustion engine and two axle half shafts via a differential.

FIG. 2 shows a first mode of operation of the hybrid drive unit 100 in which the further motor 2 transmits torque to the axle half shafts 4a, 4b and to the vehicle wheels 6a, 6b via the differential 3, as indicated by arrows 17, 17a, 17b. The same amount of torque or different amounts of torque may be transmitted to the axle half shafts 4a, 4b through the differential 3. For example, different amounts of torque may be transmitted to the axle half shafts 4a, 4b as the vehicle including the hybrid drive unit 100 drives around a curve and the vehicle wheels 6a, 6b rotate at different speeds. At the same time, the electric motor 1 does not transmit torque to the axle half shafts 4a, 4b, for instance because based on a torque request from the torque request receiving device 9 the controller 11 determines that the requested torque may be provided by the further motor 2 alone, and/or because the controller 11 determines that a charge condition of a battery connected and providing power to the electric motor 1 is below a threshold charge.

Figure 3:
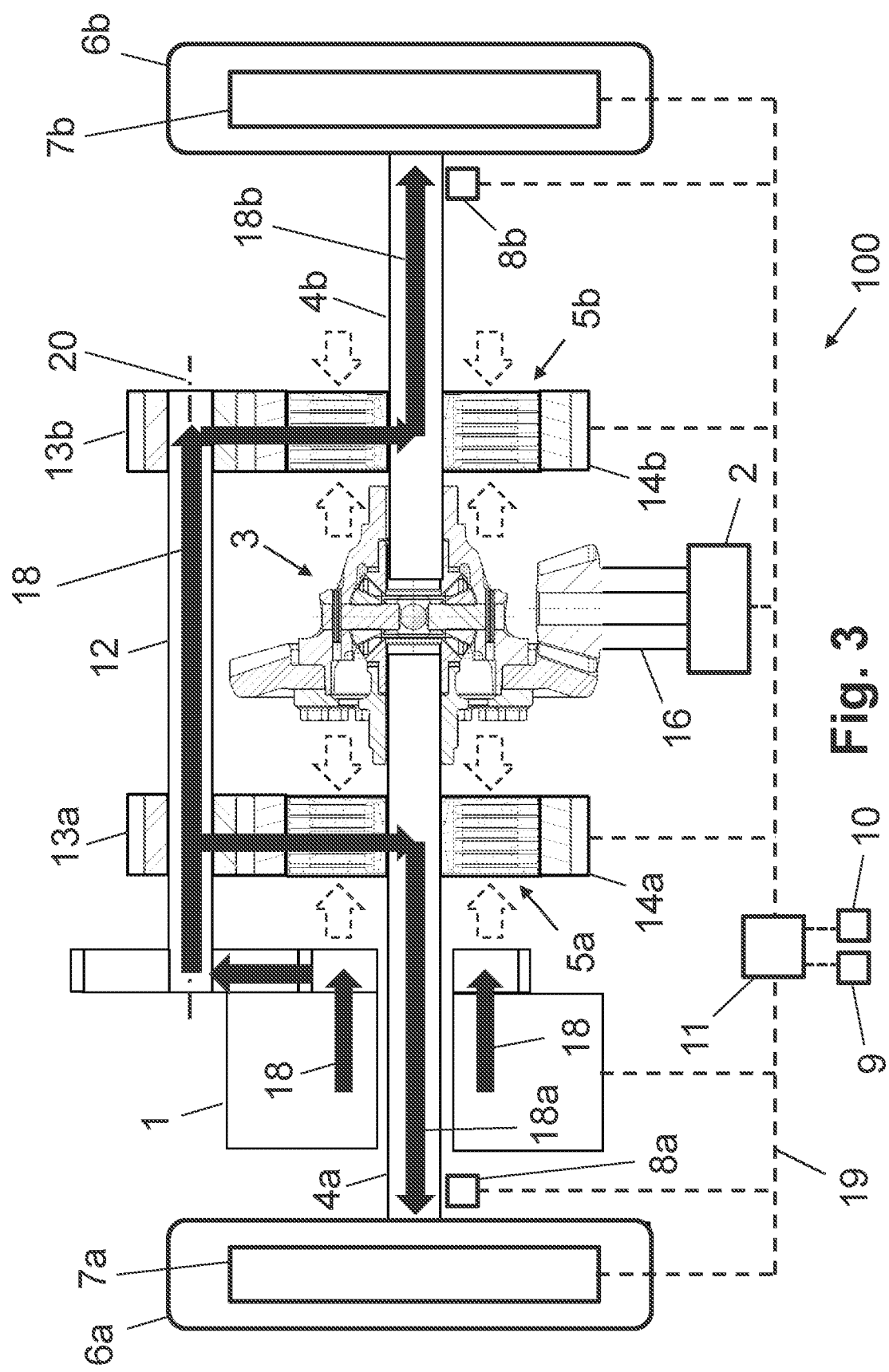
FIG. 3 schematically shows the hybrid drive unit of FIG. 1, with arrows indicating a torque flow between an electric motor and the two axle half shafts via two clutching devices.

FIG. 3 shows a second mode of operation of the hybrid drive unit 100 in which the electric motor 1 transmits torque to the axle half shafts 4a, 4b and to the vehicle wheels 6a, 6b via the clutching devices 5a, 5b, as indicated by arrows 18, 18a, 18b. In FIG. 3, the fact that one or both of the clutching devices 5a, 5b are closed or that one or both of the clutching devices 5a, 5b are in a slip state and at least partially in frictional engagement is indicated by dashed arrows. At the same time, the further motor 2 does not transmit torque to the axle half shafts 4a, 4b, for example because based on a torque request from the torque request receiving device 9 the controller 11 determines that the requested torque may be provided by the electric motor 1 alone. For instance, in cases where the further motor 2 is or includes a combustion engine, using only the electric motor 1 may reduce emissions. Or the further motor 2 does not transmit torque to the axle half shafts 4a, 4b because the controller 11 determines that a fill level of a fuel tank providing fuel to the further motor 2 is below a threshold fill level, for example.

Still referring to the mode of operation depicted in FIG. 3, based on input signals from one or more or all of the torque request receiving device 9, the steering angle sensor 10 and the speed sensors 8a, 8b, the controller 11 may control the clutching devices 5a, 5b to transmit the same amount of torque or different amounts of torque from the electric motor 1 to the two axle half shafts 4a, 4b. For example, based on input signals from one or more or all of the torque request receiving device 9, the steering angle sensor 10, and the speed sensors 8a, 8b, the controller 11 may influence or control the amount of torque transmitted to each of the axle half shafts 4a, 4b via the clutching devices 5a, 5b by controlling the degree of frictional engagement between the input and the output of each of the clutching devices 5a, 5b. For example, the controller 11 may be configured to control the clutching devices 5a, 5b in such a way that at a given instant a level of engagement between an input and an output of the first clutching device 5a is different from a level of engagement between an input and an output of the second clutching device 5b. In this way, the controller 11 may control the clutching devices 5a, 5b to act as a differential or as an active differential distributing torque from the electric motor 1 to the axle half shafts 4a, 4b. Additionally or alternatively, the controller 11 may be configured to influence or control the amount of torque transmitted to each of the axle half shafts 4a, 4b and/or to each of the vehicle wheels 6a, 6b by controlling the brakes 7a, 7b.

For example, when a steering angle or steering request received from the steering angle sensor 10 indicates that the vehicle is travelling straight ahead and the speed sensors 8a, 8b indicate that both axle half shafts 4a, 4b and/or both vehicle wheels 6a, 6b turn at the same speed, the controller 11 may control the clutching devices 5a, 5b in such a way that a level of engagement between an input and an output of the first clutching device 5a is equal to a level of engagement between an input and an output of the second clutching device 5b. In this way an amount of torque transmitted from the electric motor 1 to the first axle half shaft 4a and the first vehicle wheel 6a via the first clutching device 5a is equal to an amount of torque transmitted from the electric motor 1 to the second axle half shaft 4b and the second vehicle wheel 6b via the second clutching device 5b.

For example, situations in which a request for an amount of torque to be transmitted to the first vehicle wheel 6a may be different from a request for an amount of torque to be transmitted to the second vehicle wheel 6b may include but are not limited to the vehicle driving around a curve, the two vehicle wheels 6a, 6b travelling on different soil types, or a difference in rotational speed between the vehicle wheels 6a, 6b exceeding a threshold speed difference, for example. For instance, when one or more or all of a torque request received from the device 9, a steering angle or steering request received from the steering angle sensor 10 or speed signals received from the speed sensors 8a, 8b indicate that an amount of torque and/or a speed provided at one or both of the vehicle wheels 6a, 6b is to be altered, the controller 11 may alter the amount of torque and/or speed provided by the electric motor 1, and/or the controller 11 may alter torque transmission through one or both of the clutching devices 5a, 5b by altering a level of engagement between the input and the output of one or both of the clutching devices 5a, 5b, respectively. Specifically, an amount of torque transmitted from the electric motor 1 to the first axle half shaft 4a may be increased/decreased by increasing/decreasing engagement between the input and the output of the first clutching device 5a, and an amount of torque transmitted from the electric motor 1 to the second axle half shaft 4b may be increased/decreased by increasing/decreasing engagement between the input and the output of the second clutching device 5b. Additionally or alternatively, the controller 11 may at least partially actuate or release one or both of the brakes 7a, 7b.

Figure 4:
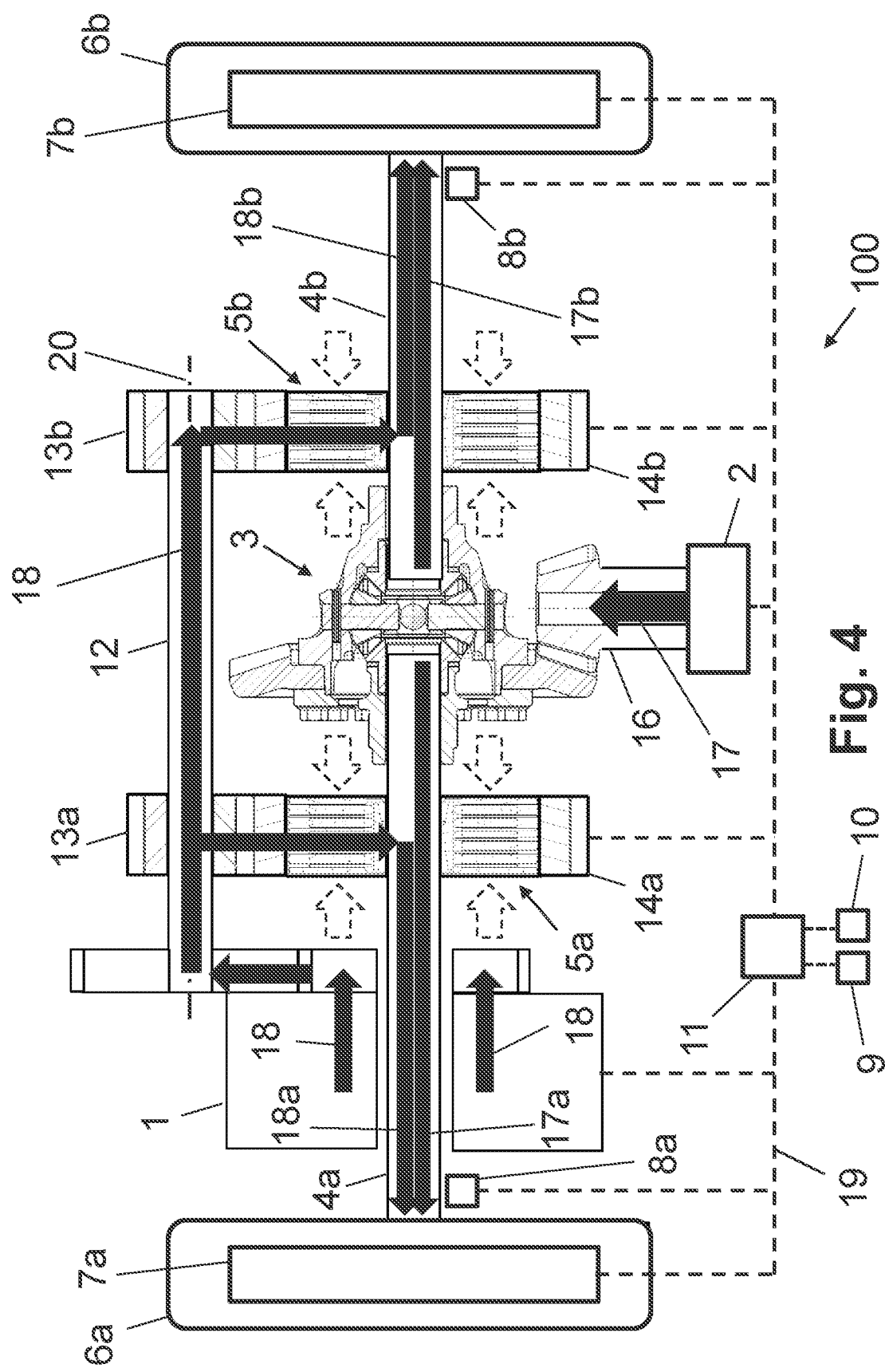
FIG. 4 schematically shows the hybrid drive unit of FIG. 1, with arrows indicating a torque flow between the combustion engine and the two axle half shafts via the differential, and between the electric motor and the two axle half shafts via the two clutching devices.

FIG. 4 shows a third mode of operation of the hybrid drive unit 100 in which both the electric motor 1 and the further motor 2 transmit torque to the axle half shafts 4a, 4b and to the vehicle wheels 6a, 6b, as indicated again by arrows 17, 17a, 17b, 18, 18a, 18b. For example, the controller 11 may command both motors 1, 2 to transmit torque to the axle half shafts 4a, 4b and to the vehicle wheels 6a, 6b when the controller determines that a torque request received from the torque request receiving device 9 may not be met by one of the two motors 1, 2 alone. Again, in the mode of operation depicted in FIG. 4 the controller 11 may control the clutching devices 5a, 5b to transmit different amounts of torque from the electric motor 1 to the axle half shafts 4a, 4b, as explained above with reference to FIG. 3.

Figure 5:
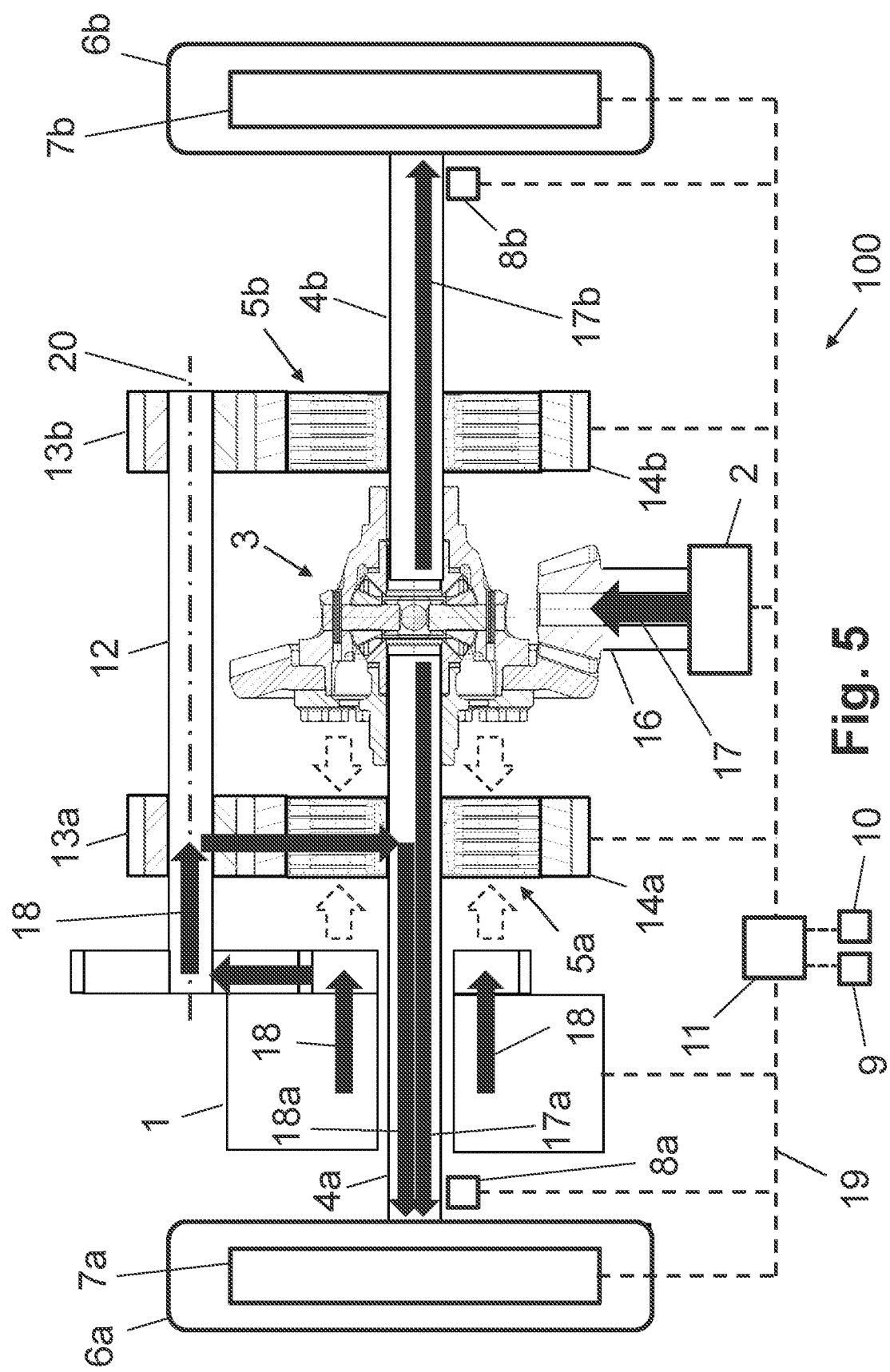
FIG. 5 schematically shows the hybrid drive unit of FIG. 1, with arrows indicating a torque flow between the combustion engine and the two axle half shafts via the differential, and between the electric motor and only one of the two axle half shafts via one of the two clutching devices.

For example, FIG. 5 shows a fourth mode of operation, a variant of the mode of operation of the hybrid drive unit 100 depicted in FIG. 4, wherein torque from the electric motor 1 is transmitted to the first axle half shaft 4a via the first clutching device 5a and no torque is transmitted from the first electric motor 1 via the second clutching device 5b. That is, the controller 11 controls the first clutching device 5a such that the input and the output of the first clutching device 5a are in full or at least in partial engagement with one another, and the controller 11 opens the second clutching device 5b. In this way, torque from the electric motor 1 may be added to only one of the axle half shafts 4a, 4b in order to provide a differential torque between the two axle half shafts 4a, 4b, for example.

Figure 6:
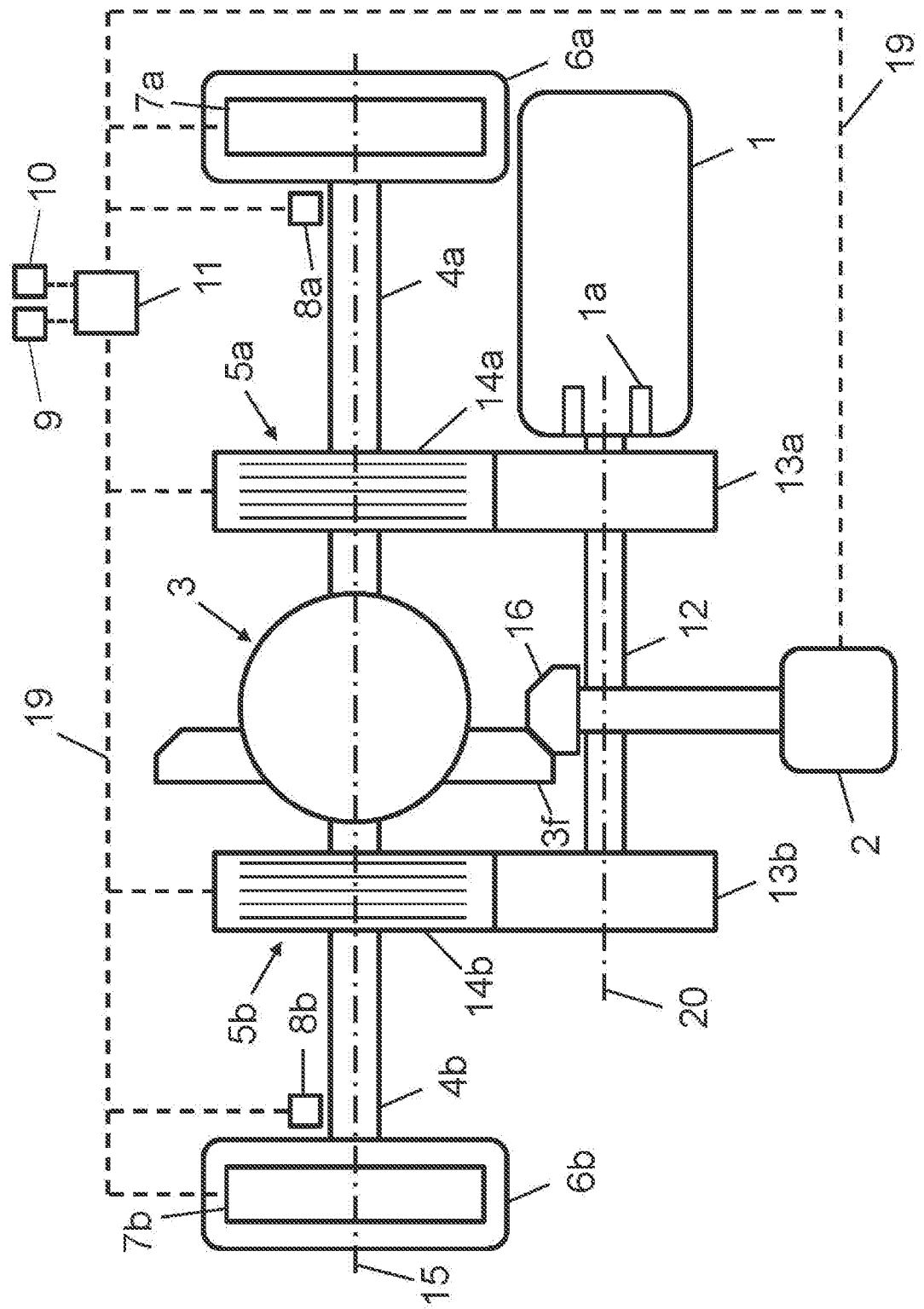
FIG. 6 schematically shows a hybrid drive unit of the presently proposed type according to a second embodiment wherein a rotor of an electric motor is disposed in parallel to and at a distance from two axle half shafts.

FIG. 6 shows a schematic of a hybrid drive unit 200 of the presently proposed type according to a second embodiment. As before, recurring features are designated with the same reference signs. The hybrid drive unit 200 according to FIG. 6 differs from the hybrid drive unit according to FIGS. 1-5 in that the rotor of the electric motor 1 is coaxially aligned with the transmission shaft 12. For example, in the hybrid drive unit 200 according to FIG. 6 the rotor 1a of the electric motor 1 may be directly connected to the transmission shaft 12. However, it is understood that in alternative embodiments of the hybrid drive unit 200 not explicitly depicted here the rotor of the electric motor 1 may be connected to the transmission shaft 12 by means of a cardan joint and/or a torsional damper, for example. In FIG. 6, the bevel pinion 16 is typically disposed above or below the transmission shaft 12.

Figure 7:
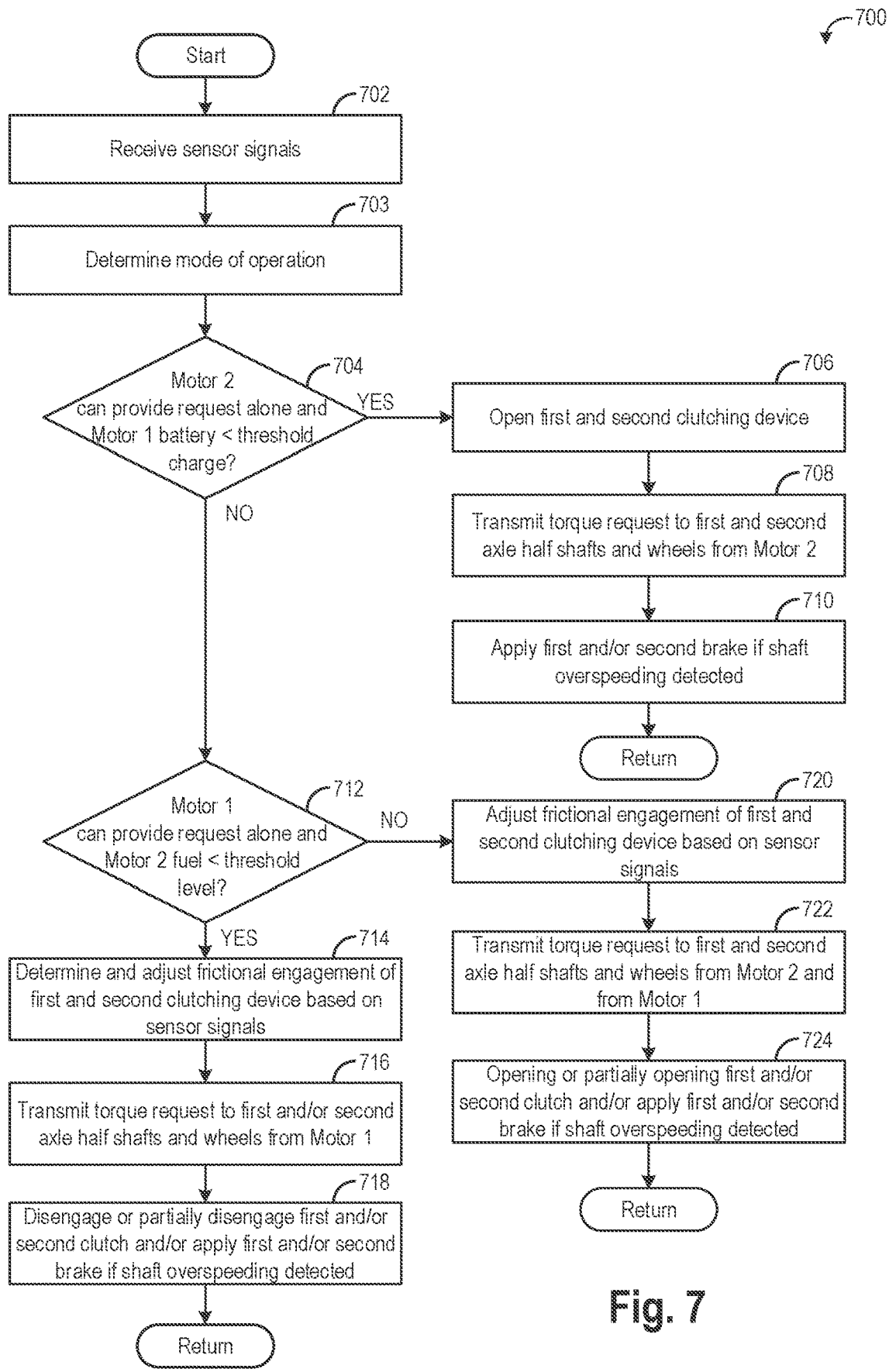
FIG. 7 shows a flow chart for an example method for determining a mode of operation for the hybrid drive unit depicted in FIGS. 1-6.

FIG. 7 shows a flow chart for an example method 700 for determining a mode of operation for the hybrid drive unit depicted in FIGS. 1-6. As one example, the method 700 includes during a selected mode of operation, fulfilling torque or speed requests (e.g., increase and decrease) by one or more of a first electric motor with independently controlled first and second clutches for differential control of first and second axle half shafts, driving first and second axle half shafts with a second further motor via an axle differential, and independently controlled first and second brakes. Instructions for carrying out method 700 may be executed by a controller based on instructions stored on a memory of the controller and in conjunction with signals received from sensors of the drive unit, such as controller 11, speed sensors 8a, 8b torque receiving device 9, and steering angle sensor 10, such described above with references to FIG. 1-6. The controller may adjust actuators of the hybrid drive unit to adjust drivetrain operation, according to the method 700 described below.

At 702, method 700 includes receiving sensor signals. Sensor signals may include a rotational speed of the first and second axle half shafts and/or of the first and second vehicle wheels. Sensor signals may include a torque request such as how far depressed is a throttle pedal or a joystick. Similarly, sensor signals may include a speed request. Sensor signals may further include an indication of the steering wheel angle.

At 703, the method 700 includes determining a mode of drive unit operation based on requested torque and torque capacity of the first electric motor and the second further motor.

At 704, method 700 includes determining whether the second further motor can provide a torque request alone and whether the first electric motor has less than threshold battery charge. For example, the second further motor may be an internal combustion engine that provides requested torque when the first electric motor has low battery charge. As one example, control of the drive unit with the second further motor may allow the electric motor to recharge via regenerative braking and/or enable the vehicle operator to continue driving until a charging station is available. If yes, the method 700 continues to 706.

At 706, the method includes opening the first clutching device and the second clutching device, disengaging the first electric motor from driving the first and second axle half shafts. At 708, the method includes transmitting torque requests to first and second axle half shafts and wheels from the second further motor. At 710 the method includes applying first and/or second brakes if shaft overspeeding is detected. In one example, first and second brakes may independently control first and second axle half shafts, respectively, and may be applied in combination or independently to reduce shaft overspeeding and vehicle speed.

Returning to 704, if the second further motor may not provide requested torque alone and the first electric motor battery charge is greater than a threshold charge, the method 700 continues to 712. At 712, the method 700 includes determining whether the first motor can provide the request alone and the second further motor fuel level is less than a threshold level. As one example, the first electric motor may provide requested torque when the second further motor has low fuel. As one example, control of the drive unit with the electric motor alone may allow the vehicle operator to continue driving until a refilling station is available. Additionally or alternatively, the method may include determining whether the first electric motor can provide the torque request alone irrespective of the fuel level of second further motor such when fuel use is not desired. If yes, the method 700 continues to 714.

At 714, the method 700 includes determining and adjusting frictional engagement of the first and second clutching devices based on sensor signals. In one example, one or both of the first and second clutching devices may be closed or controlled in a slip state. In another example, with the first and second clutching devices closed or controlled in a slip state, equal or different amounts of torque may be transmitted from the first electric motor via the first and second axle half shafts to the vehicle wheels. At 716, the method 700 includes transmitting the torque request to the first and second axle half shafts and wheels from the first electric motor. As one example, in this driving mode, the second further motor is disengaged from driving the first and second axle half shafts. At 718, the method 700 includes opening or partially opening the first and/or second clutching device and/or applying first and/or second brakes if shaft overspeeding is detected. As one example, overspeeding may be reduced by opening or partially opening one or both of the first and second clutching devices without assistance from the brakes. Additionally or alternatively, one or both of the first and second brakes may be applied in combination or independently to reduce shaft overspeeding and reduce vehicle speed without adjusting the first or second devices.

Returning to 712, if the first electric motor cannot provide requested torque alone and the second further motor fuel level is greater than a threshold level, the method 700 continues to 720. At 720, the method includes adjusting frictional engagement of the first and second clutching device based on sensor signals. As described above, one or both of the first and second clutching devices may be closed or controlled in slip state. In another example, one of the first and second clutching devices may be closed or controlled in a slip state and the other of the first and second clutching devices may be open. Controlling requested torque in this way, torque from the first motor may be added to only one of the axle half shafts providing a differential torque between the first and second axle half shafts. At 722, the method includes transmitting requested torque to the first and second axle half shafts and wheels from the first electric motor and the second further motor. At 724, the method includes opening or partially opening one or both of the first and second clutching devices if overspeeding is detected. Additionally or alternatively, the method may include applying one or both of the first and second brakes to reduce rotational speed of the first and second axle half shafts, respectively.

In this way, an electric motor is selectively drivingly engagable with a first axle half shaft via a first clutching device and with a second axle half shaft via a second clutching device. By independently controlling torque to the first and second axle half shafts via independent clutching devices, torque vectoring functionality in a simple and efficient manner is achieved. The technical effect of the hybrid drive unit system and method disclosed herein is increased vehicle drivability.

The disclosure also provides support for a hybrid drive unit, comprising: an electric motor, an axle differential for connection with a further motor, a first axle half shaft and a second axle half shaft connected to the axle differential, a first clutching device and a second clutching device, wherein the electric motor is selectively drivingly engagable with the first axle half shaft via the first clutching device and with the second axle half shaft via the second clutching device. In a first example of the system, the system further comprises: a transmission shaft arranged in parallel to the first axle half shaft and the second axle half shaft, wherein the electric motor is selectively drivingly engagable with the first axle half shaft via the transmission shaft and the first clutching device, and with the second axle half shaft via the transmission shaft and the second clutching device. In a second example of the system, optionally including the first example, the system further comprises: a controller configured to control the first clutching device and the second clutching device independently of one another. In a third example of the system, optionally including one or both of the first and second examples, the system further comprises: a first speed sensor for measuring a rotational speed of the first axle half shaft, and a second speed sensor for measuring the rotational speed of the second axle half shaft, wherein the controller is configured to control the first clutching device and the second clutching device based on at least one of: a first speed sensor signal or first speed sensor data received from the first speed sensor, and a second speed sensor signal or second speed sensor data received from the second speed sensor. In a fourth example of the system, optionally including one or more or each of the first through third examples, the system further comprises: a first brake for braking the first axle half shaft or for braking a first vehicle wheel mounted on the first axle half shaft, and a second brake for braking the second axle half shaft or for braking a second vehicle wheel mounted on the second axle half shaft, wherein the controller is further configured to control the first brake and the second brake based on at least one of: the first speed sensor signal or the first speed sensor data, and the second speed sensor signal or the second speed sensor data. In a fifth example of the system, optionally including one or more or each of the first through fourth examples, the controller is configured to control the first clutching device and the second clutching device based on at least one of: a vehicle torque request, a vehicle speed request, and a steering angle. In a sixth example of the system, optionally including one or more or each of the first through fifth examples, the electric motor is selectively drivingly engagable with the first axle half shaft via a first transmission gear disposed on the transmission shaft and a first axle gear disposed on the first axle half shaft, and wherein the electric motor is selectively drivingly engagable with the second axle half shaft via a second transmission gear disposed on the transmission shaft and a second axle gear disposed on the second axle half shaft. In a seventh example of the system, optionally including one or more or each of the first through sixth examples, the first transmission gear is in mesh with the first axle gear and the second transmission gear is in mesh with the second axle gear. In a eighth example of the system, optionally including one or more or each of the first through seventh examples, the first clutching device is configured to selectively drivingly engage the first transmission gear with the transmission shaft or to selectively drivingly engage the first axle gear with the first axle half shaft, and/or wherein the second clutching device is configured to selectively drivingly engage the second transmission gear with the transmission shaft or to selectively drivingly engage the second axle gear with the second axle half shaft. In a ninth example of the system, optionally including one or more or each of the first through eighth examples, the first axle half shaft and the second axle half shaft are coaxially aligned. In a tenth example of the system, optionally including one or more or each of the first through ninth examples, the system further comprises: a first vehicle wheel mounted on and coaxially aligned with the first axle half shaft, and a second vehicle wheel mounted on and coaxially aligned with the second axle half shaft. In a eleventh example of the system, optionally including one or more or each of the first through tenth examples, the electric motor comprises a rotor coaxially aligned with or arranged in parallel to the first axle half shaft. In a twelfth example of the system, optionally including one or more or each of the first through eleventh examples, the first axle half shaft reaches through the rotor of the electric motor. In a thirteenth example of the system, optionally including one or more or each of the first through twelfth examples, the system further comprises: the further motor such as a combustion engine, wherein the further motor is configured to drive the first axle half shaft and the second axle half shaft via the axle differential.

The disclosure also provides support for a method for a hybrid drive unit having an electric motor, an axle differential for connection with a further motor, a first axle half shaft and a second axle half shaft connected to the axle differential, and a first clutching device, a second clutching device, the method comprising: controlling the first clutching device and the second clutching device independently of one another, including selectively drivingly engaging the first axle half shaft via the first clutching device and with the second axle half shaft via the second clutching device. In a first example of the method, the method further comprises: during a first mode of operation, opening the first clutching device and the second clutching device and driving the first axle half shaft and the second axle half shaft with the further motor via the axle differential. In a second example of the method, optionally including the first example, the method further comprises: during a second mode of operation, closing or partially closing the first clutching device and the second clutching device and drivingly disengaging the first axle half shaft and the second axle half shaft with the further motor via the axle differential. In a third example of the method, optionally including one or both of the first and second examples, the method further comprises: during a third mode of operation, closing or partially closing the first clutching device and the second clutching device and driving the first axle half shaft and the second axle half shaft with the further motor via the axle differential. In a fourth example of the method, optionally including one or more or each of the first through third examples, the method further comprises: during a fourth mode of operation, closing or partially closing one of the first clutching device and the second clutching device, opening the other one of the first clutching device and the second clutching device, and driving the first axle half shaft and the second axle half shaft with the further motor via the axle differential. In a fifth example of the method, optionally including one or more or each of the first through fourth examples, the method further comprises: selecting a mode of drive unit operation based on requested torque and torque capacity of the electric motor and the further motor.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The invention claimed is:

1. A hybrid drive unit, comprising:
a first electric motor;
an axle differential for connection with a second electric motor, an internal combustion engine, or a hydraulic motor;
a first axle half shaft and a second axle half shaft connected to the axle differential;
a first clutching device and a second clutching device;
wherein the electric motor is selectively drivingly engagable with the first axle half shaft via the first clutching device and with the second axle half shaft via the second clutching device;
wherein the first electric motor comprises a rotor coaxially aligned with or arranged in parallel to the first axle half shaft; and
wherein the first axle half shaft reaches through the rotor of the first electric motor.

2. The hybrid drive unit of claim 1, further comprising a transmission shaft arranged in parallel to the first axle half shaft and the second axle half shaft,
wherein the first electric motor is selectively drivingly engagable with the first axle half shaft via the transmission shaft and the first clutching device, and with the second axle half shaft via the transmission shaft and the second clutching device.

3. The hybrid drive unit according to claim 1, further comprising a controller configured to control the first clutching device and the second clutching device independently of one another.

4. The hybrid drive unit according to claim 3, further comprising a first speed sensor for measuring a rotational speed of the first axle half shaft, and a second speed sensor for measuring the rotational speed of the second axle half shaft, wherein the controller is configured to control the first clutching device and the second clutching device based on at least one of: a first speed sensor signal or first speed sensor data received from the first speed sensor, and a second speed sensor signal or second speed sensor data received from the second speed sensor.

5. The hybrid drive unit according to claim 4, further comprising a first brake for braking the first axle half shaft or for braking a first vehicle wheel mounted on the first axle half shaft, and a second brake for braking the second axle half shaft or for braking a second vehicle wheel mounted on the second axle half shaft, wherein the controller is further configured to control the first brake and the second brake based on at least one of: the first speed sensor signal or the first speed sensor data, and the second speed sensor signal or the second speed sensor data.

6. The hybrid drive unit according to claim 3, wherein the controller is configured to control the first clutching device and the second clutching device based on at least one of: a vehicle torque request, a vehicle speed request, and a steering angle.

7. The hybrid drive unit according to claim 2, wherein the first electric motor is selectively drivingly engagable with the first axle half shaft via a first transmission gear disposed on the transmission shaft and a first axle gear disposed on the first axle half shaft, and wherein the first electric motor is selectively drivingly engagable with the second axle half shaft via a second transmission gear disposed on the transmission shaft and a second axle gear disposed on the second axle half shaft.

8. The hybrid drive unit according to claim 7, wherein the first transmission gear is in mesh with the first axle gear and the second transmission gear is in mesh with the second axle gear.

9. The hybrid drive unit according to claim 7, wherein:
the first clutching device is configured to selectively drivingly engage the first transmission gear with the transmission shaft or to selectively drivingly engage the first axle gear with the first axle half shaft; or
the second clutching device is configured to selectively drivingly engage the second transmission gear with the transmission shaft or to selectively drivingly engage the second axle gear with the second axle half shaft.

10. The hybrid drive unit according to claim 1, wherein the first axle half shaft and the second axle half shaft are coaxially aligned.

11. The hybrid drive unit according to claim 1, further comprising a first vehicle wheel mounted on and coaxially aligned with the first axle half shaft, and a second vehicle wheel mounted on and coaxially aligned with the second axle half shaft.

12. The hybrid drive unit according to claim 1, wherein the axle differential is coupled to the internal combustion engine, wherein the internal combustion engine is configured to drive the first axle half shaft and the second axle half shaft via the axle differential.

13. A method for a hybrid drive unit having a first electric motor, an axle differential for connection with a second electric motor, an internal combustion engine, or a hydraulic motor, a first axle half shaft and a second axle half shaft connected to the axle differential, and a first clutching device, a second clutching device, the method comprising:

controlling the first clutching device and the second clutching device independently of one another, including selectively drivingly engaging the first axle half shaft via the first clutching device and with the second axle half shaft via the second clutching device;

during a first mode of operation, opening the first clutching device and the second clutching device and driving the first axle half shaft and the second axle half shaft with the second electric motor, an internal combustion engine, or a hydraulic motor via the axle differential; and during a second mode of operation, closing or partially closing the first clutching device and the second clutching device and drivingly disengaging the first axle half shaft and the second axle half shaft with the second electric motor, the internal combustion engine, or the hydraulic motor via the axle differential.

14. The method of claim 13, further comprising during a third mode of operation, closing or partially closing the first clutching device and the second clutching device and driving the first axle half shaft and the second axle half shaft with the second electric motor, the internal combustion engine, or the hydraulic motor via the axle differential.

15. The method of claim 14, further comprising during a fourth mode of operation, closing or partially closing one of the first clutching device and the second clutching device, opening the other one of the first clutching device and the second clutching device, and driving the first axle half shaft and the second axle half shaft with the second electric motor via the axle differential.

16. The method of claim 15, further comprising selecting a mode of drive unit operation based on requested torque and torque capacity of the first electric motor and the second electric motor, the internal combustion engine, or the hydraulic motor.

* * * * *